US007018507B2

(12) United States Patent
Hsieh

(10) Patent No.: US 7,018,507 B2

(45) Date of Patent: Mar. 28, 2006

(54) PRESSURE SEALER APPARATUS

(75) Inventor: Elton Hsieh, Hsinchu Hsien (TW)

(73) Assignee: Printmail Solutions Inc., Hsinchu Hsien (TW)

(*) Notice: Subject to any disclaimer, the term of this patent is extended or adjusted under 35 U.S.C. 154(b) by 131 days.

(21) Appl. No.: 10/365,927

(22) Filed: Feb. 13, 2003

(65) Prior Publication Data

US 2004/0159405 A1 Aug. 19, 2004

(51) Int. Cl.

*B32B 31/04* (2006.01)
*B65H 5/06* (2006.01)
*B65H 45/04* (2006.01)
*B65H 45/14* (2006.01)

(52) U.S. Cl. ................... 156/442.1; 156/443; 156/368; 270/32; 271/356

(58) Field of Classification Search ............. 156/442.1, 156/442.2, 442.3, 442.4, 443, 350–363, 367, 156/368; 270/32, 39.1; 271/256, 258.01, 271/258.02

See application file for complete search history.

(56) References Cited

U.S. PATENT DOCUMENTS 4,609,421 A * 9/1986 Yui ......................... 156/442.1
5,004,220 A * 4/1991 Dreschel et al. ............ 271/184
5,006,195 A * 4/1991 Martin et al. ............ 156/442.1
5,060,010 A * 10/1991 Ogura ......................... 355/407
5,205,551 A * 4/1993 Nagano et al. ............. 271/225
5,378,861 A * 1/1995 Barten et al. ............... 187/316
5,449,165 A * 9/1995 Naramore ................... 271/225
5,518,574 A * 5/1996 Yates et al. ................. 156/356
5,768,774 A * 6/1998 Wilson et al. ................ 29/840
6,162,316 A * 12/2000 Spitler et al. ............... 156/227
6,217,016 B1 * 4/2001 Honmochi et al. ........... 270/37
6,268,909 B1 * 7/2001 Honmochi et al. ......... 355/407
6,357,742 B1 * 3/2002 Ogasawara ................. 271/225
6,432,232 B1 * 8/2002 Martin ........................ 156/64

* cited by examiner

*Primary Examiner*—Sue A. Purvis
(74) *Attorney, Agent, or Firm*—Ladas & Parry LLP

(57) ABSTRACT

This invention provides a pressure sealer apparatus, for folding and sealing papers coated with adhesion at part of margins thereof into a smaller size, comprising: a buffer, controlled by a buffer motor and a buffer switch to move between an inactivated and an activated position; a paper entry provided at a downstream of the buffer; a paper alignment provided at a downstream of the paper entry, including an alignment roller set and a ball set, the ball set having a ball freely rotatable in a frame and suspended above the alignment roller set; a folding device provided at a downstream of the paper alignment; a presser provided at a downstream of the folding device, including a pressure cylinder situated to form an angle with respect to the alignment roller; and an exit provided at a downstream of the presser.

9 Claims, 10 Drawing Sheets

PRESSURE SEALER APPARATUS

CROSS-REFERENCES TO RELATED APPLICATIONS

Not Applicable

STATEMENT REGARDING FEDERALLY SPONSORED RESEARCH OR DEVELOPMENT

Not Applicable

FIELD OF INVENTION

This invention is related to a pressure sealer apparatus, particularly to one being compact and lightweight, and allowing on-line connection with a printer, such as a laser printer.

BACKGROUND OF INVENTION

Pressure sealer apparatus is commonly used for folding and sealing papers coated with adhesion at part of margins thereof into sealed mails of a smaller size. The pressure sealer apparatus may fold individual pieces of papers into two folds or three folds according to the users' needs and then apply forces to the folded paper, causing the pressure-sensitive adhesion coated to part of the margins of particular folds to seal with margins of neighboring folds, thereby forming a sealed mail that is ready to be dispatched.

Though there are several models of commercially available pressure sealer apparatus that may achieve the above objects, such conventional pressure sealer apparatus cannot align papers that are not aligned, such that the adhesion is not aligned with the margins of the neighboring folds. As a result, the sealed mails may be of a muddled appearance because adhesion coated to the papers is not properly sealed with the margins of the neighboring folds. Furthermore, the conventional pressure sealer apparatus requires a large-sized pressure cylinder to ensure the folded papers having a relatively large thickness may be glided underneath the pressure cylinder. Such large-sized pressure cylinder, at the same time, must be driven by a heavy-duty motor such that it is common for the conventional pressure sealer apparatus weighing over 100 kilograms and consisting of a relatively large size, which is not suitable to be equipped in a regular office space but at a designated location, such as a mailroom.

The large size and heavy weight of the conventional pressure sealer apparatus prevents the conventional pressure sealer apparatus from being connected to a laser printer for on-line operations. In other words, the papers that need to be folded and sealed into two-fold or three-fold mails for delivery must be first printed by printers in batches and then transported to the mailroom. The papers in batches are then fed into the pressure sealer apparatus one by one to be folded, compressed and sealed into mails. Apparently, such a process cannot meet the needs of print-on-demand and print-to-mail.

SUMMARY OF INVENTION

The object of this invention is to provide a pressure sealer apparatus capable of automatically aligning the papers so as to ensure a neat appearance for the sealed mails.

Another object of this invention is to provide compact and lightweight pressure sealer apparatus.

A further object of this invention is to provide a pressure sealer apparatus that allows on-line connection with a printer, and can automatically control activation and deactivation of the printing task during the occurrences of paper jamming to prevent system shutdown.

A further object of this invention is to provide a pressure sealer apparatus that can meet the needs of print-on-demand and print-to-mail.

To achieve the above objects, this invention provides a pressure sealer apparatus, for folding and sealing papers coated with adhesion at part of margins thereof into a self-mailer, comprising: a buffer, controlled by a buffer motor and a buffer switch to move between an inactivated and an activated position; a paper entry provided at a downstream of the buffer; a paper alignment provided at a downstream of the paper entry, including an alignment roller set and at least one ball set, the ball set having a ball freely rotatable in a frame and suspended above the alignment roller set; a folding device provided at a downstream of the paper alignment; a presser provided at a downstream of the folding device, including a pressure cylinder situated to form an angle with respect to the alignment roller; and an exit provided at a downstream of the presser.

According to an alternative embodiment of this invention, the pressure sealer apparatus comprises: a paper entry; a manipulator adjacent to the paper entry and capable of adjusting its operative range for triggering a device external to the pressure sealer apparatus; a paper alignment provided at a downstream of the paper entry, including an alignment roller set and at least one ball set, the ball set having a ball freely rotatable in a frame and suspended above the alignment roller set; a folding device provided at a downstream of the paper alignment; a presser provided at a downstream of the folding device, including a pressure cylinder situated to form an angle with respect to the alignment roller; and an exit provided at a downstream of the presser.

The structures and characteristics of this invention can be realized by referring to the appended drawings and explanations of the preferred embodiments.

DETAILED DESCRIPTION OF INVENTION

Figure 1:
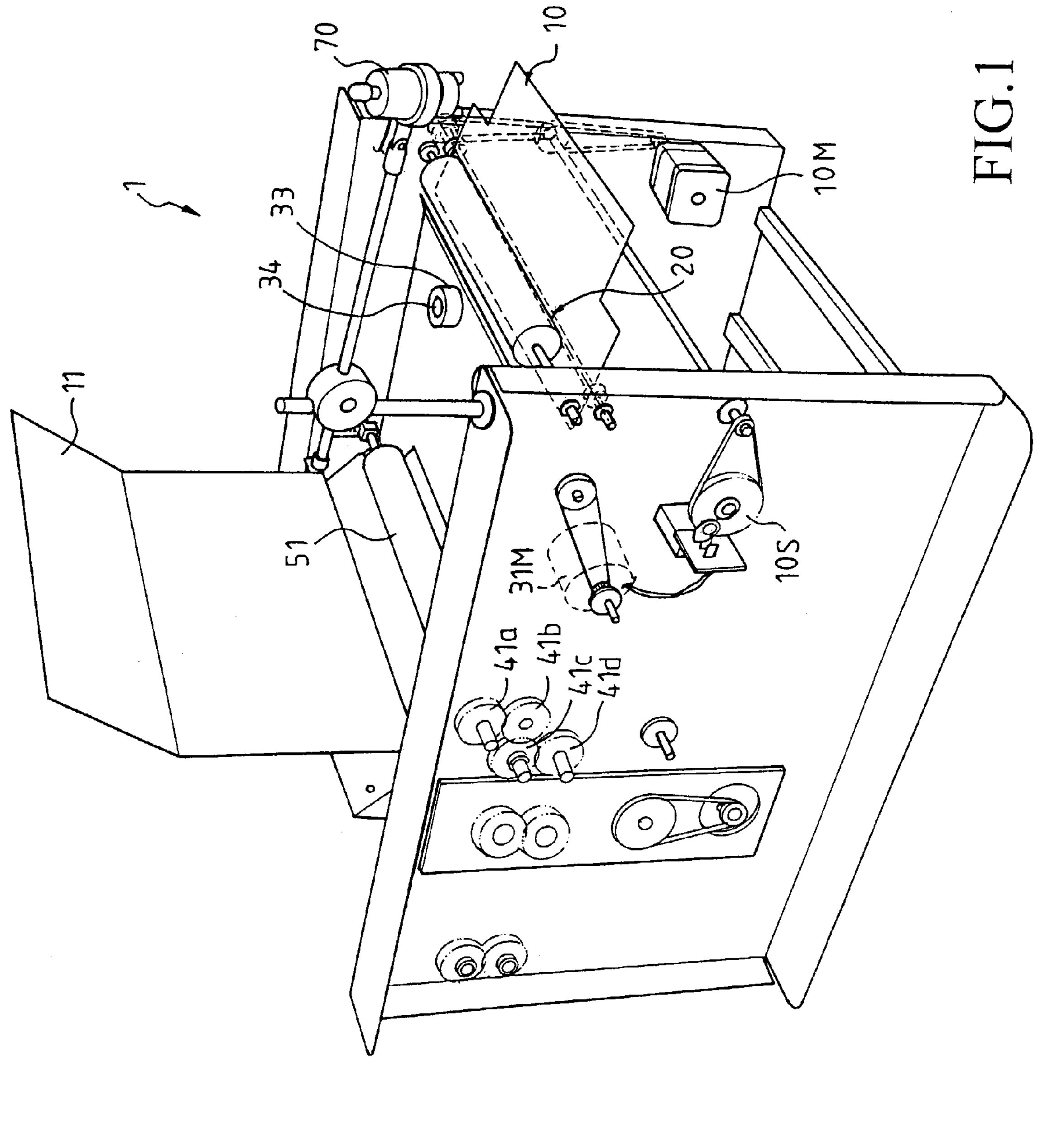
FIG. 1 is a perspective view showing a pressure sealer apparatus according to this invention, wherein the lid is in its open state.
Figure 2:
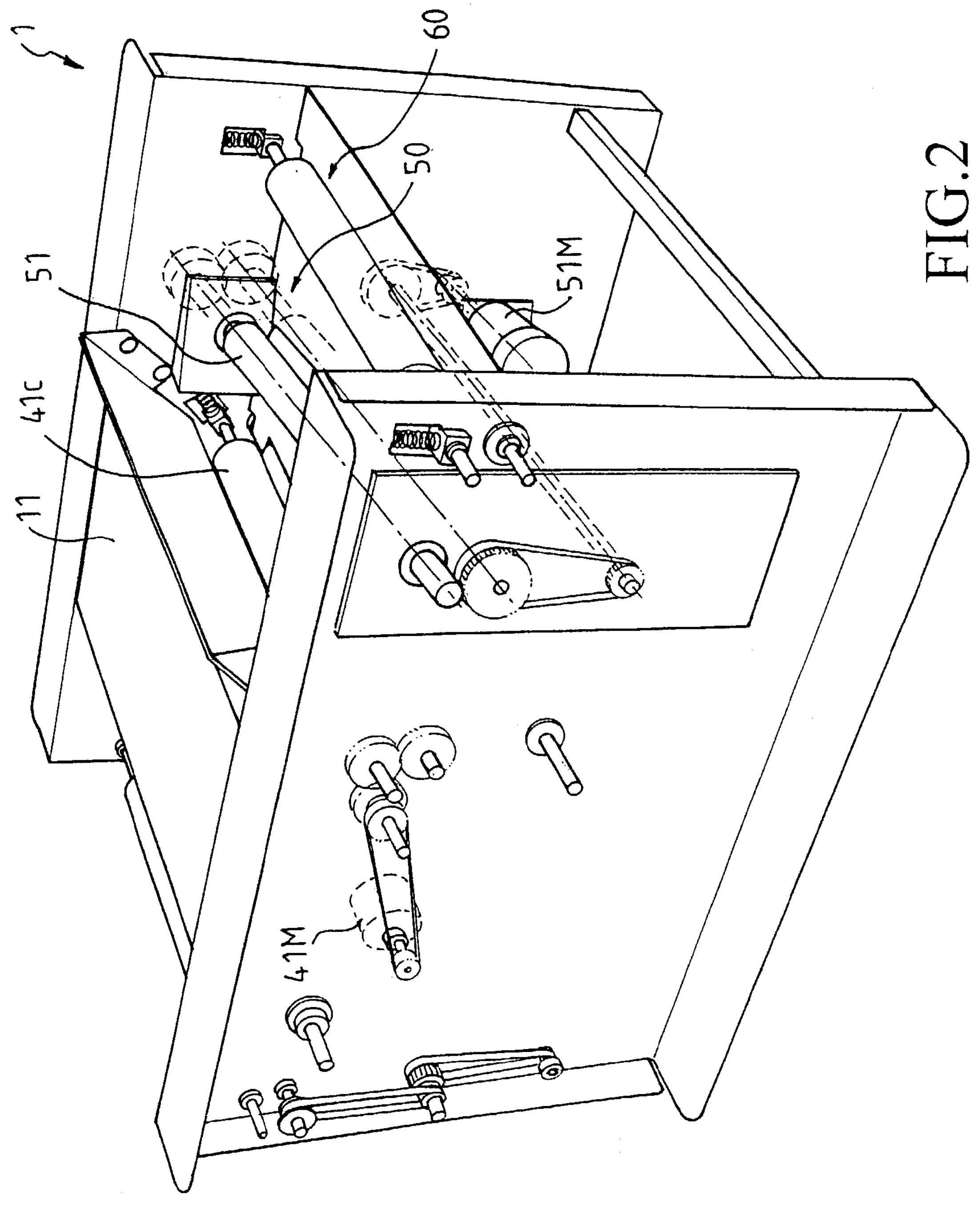
FIG. 2 is a perspective view showing a pressure sealer apparatus according to this invention, wherein the lid is in its closed state.

FIG. 1 illustrates a perspective view of a pressure sealer apparatus 1 according to this invention, wherein a lid 11 is in its open state. FIG. 2 is another perspective view showing a pressure sealer apparatus 1 according to this invention, wherein the lid 11 is in its closed state. The pressure sealer apparatus 1 in FIG. 2 is not provided with a manipulator; the functions of the manipulator will be described hereinafter.

Figure 3:
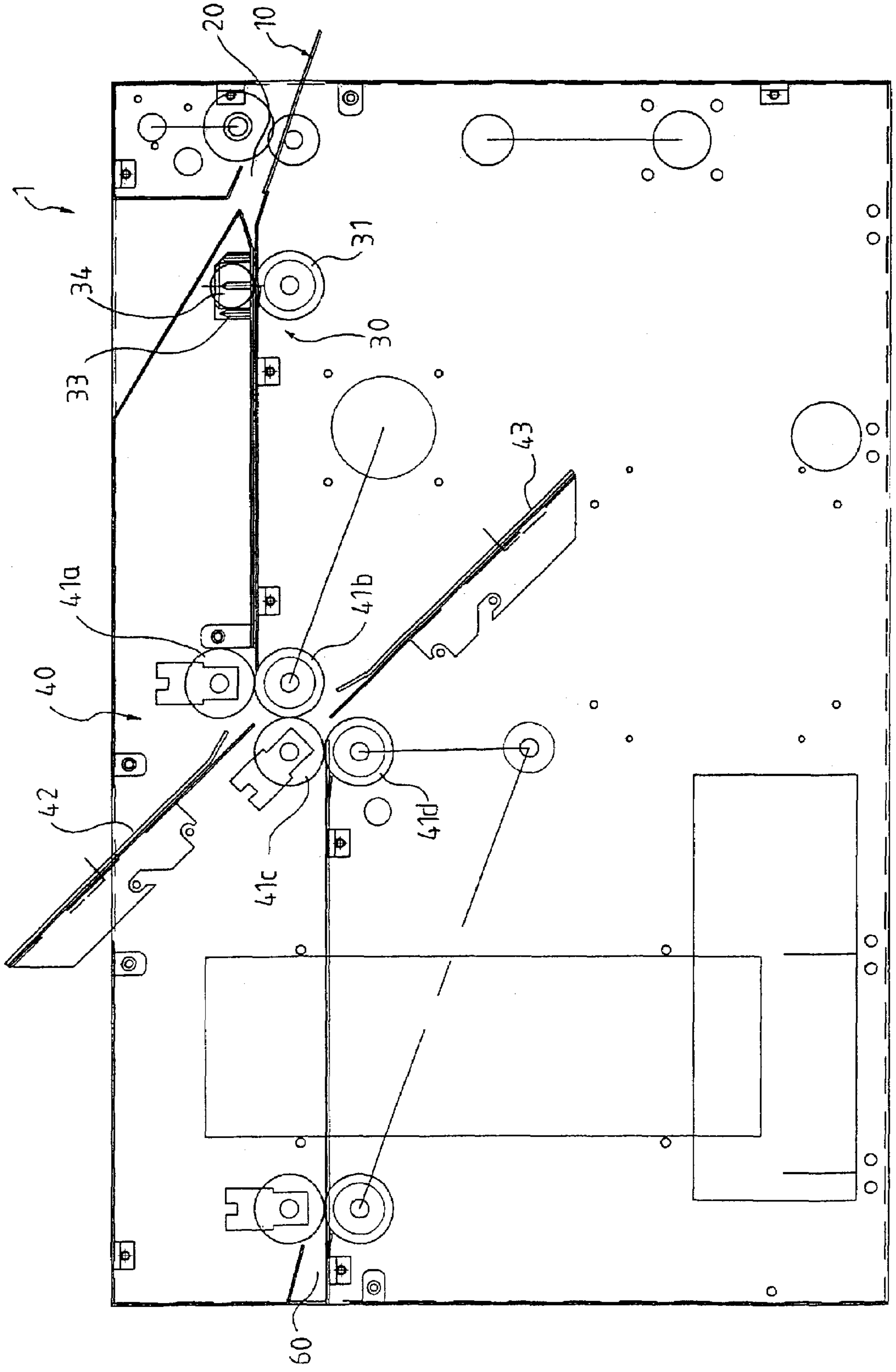
FIG. 3 is a cross-sectional, elevational view of the pressure sealer apparatus according to this invention.

FIG. 3 is a cross-sectional, elevational view of the pressure sealer apparatus 1 according to this invention.

With reference to FIGS. 1 and 3, the pressure sealer apparatus 1 according to this invention comprises: a buffer 10, a paper entry 20, a paper alignment 30, a folding device 40, a presser 50, and an exit 60 that are sequentially provided from an upstream to a downstream of pressure sealer apparatus 1.

Figure 4:
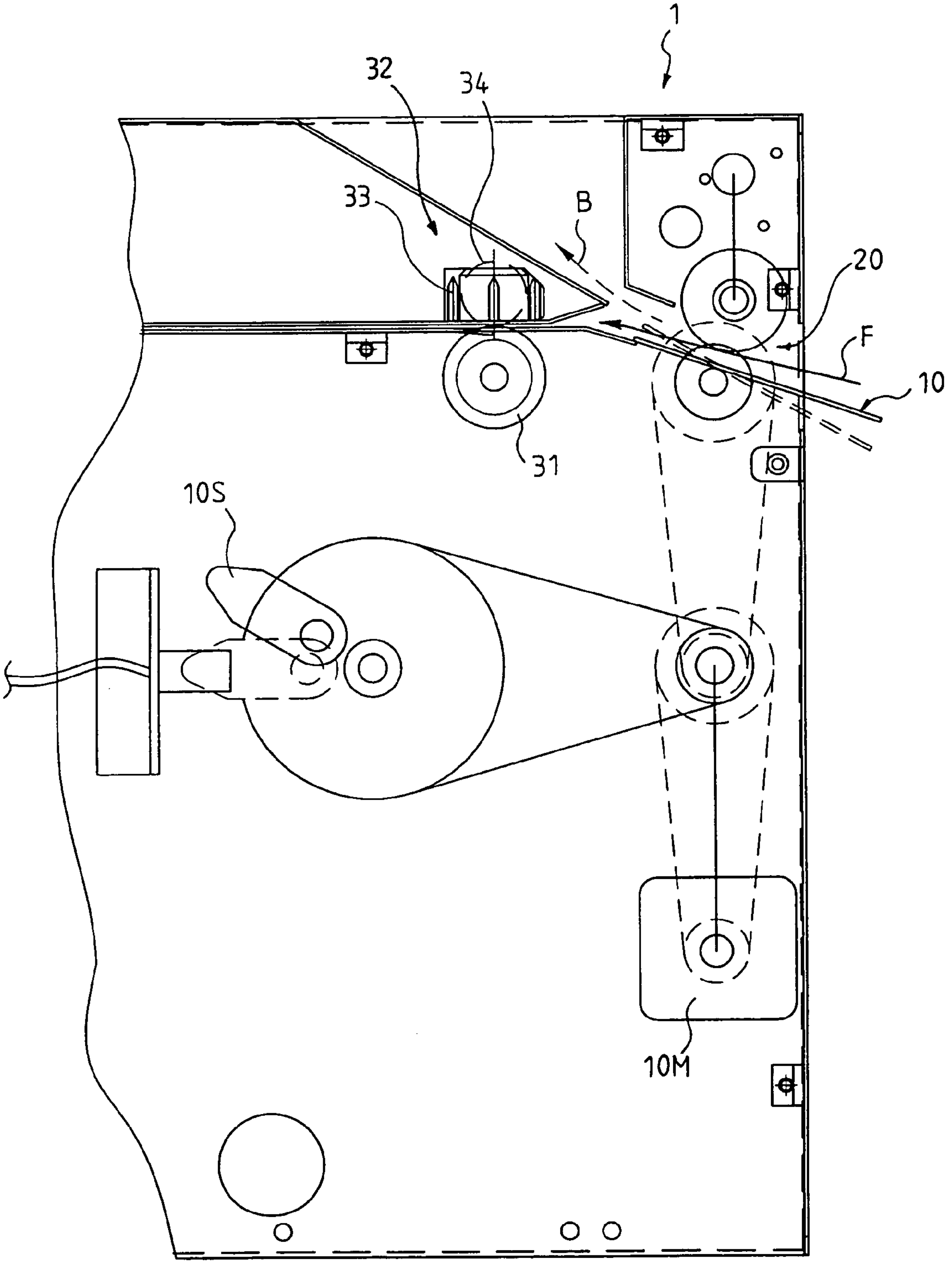
FIG. 4 is another cross-sectional, elevational view of the pressure sealer apparatus according to this invention, showing details of the paper entry buffer.
Figure 5:
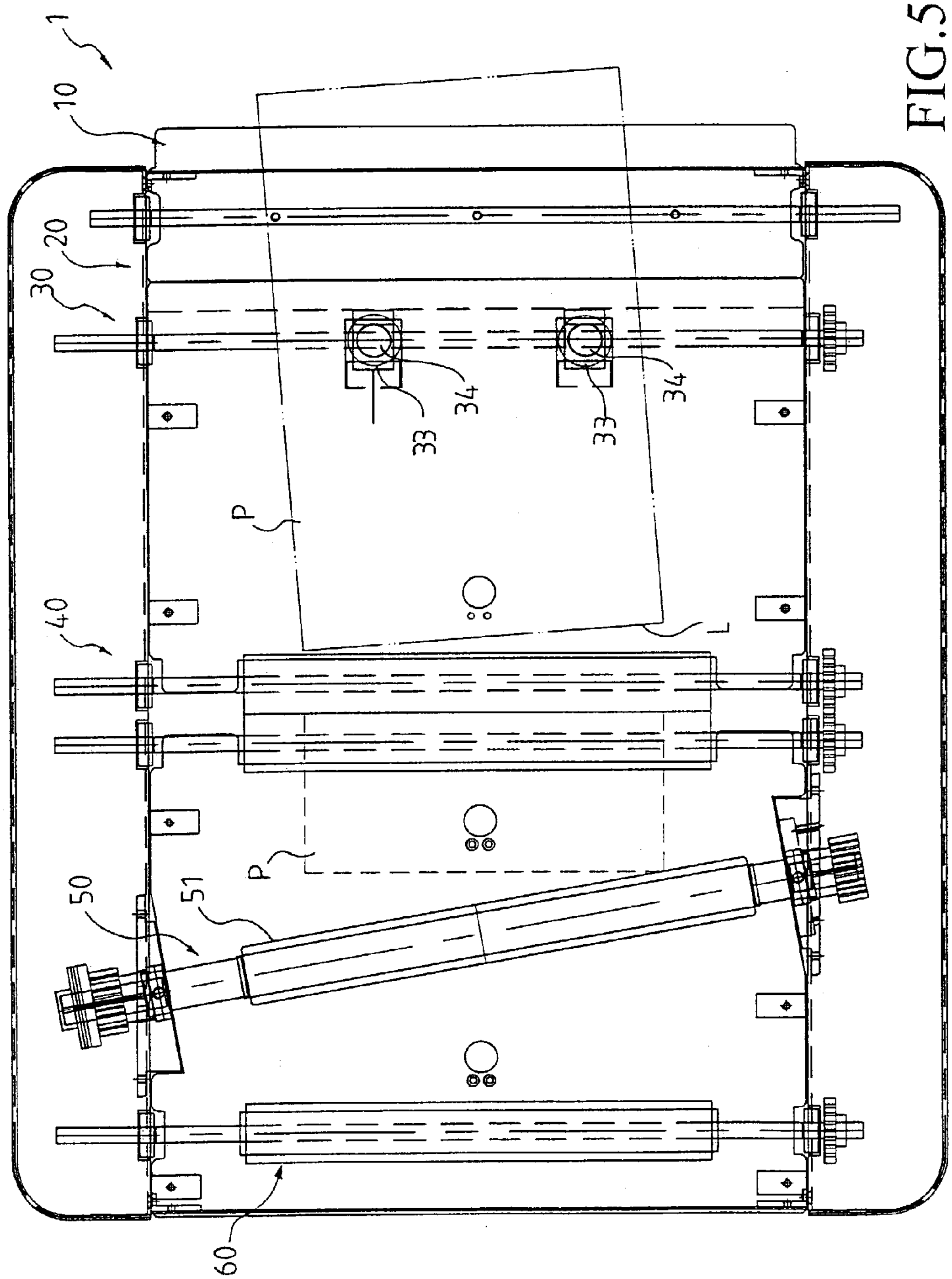
FIG. 5 is a top plan view of the pressure sealer apparatus according to this invention.
Figure 6A:
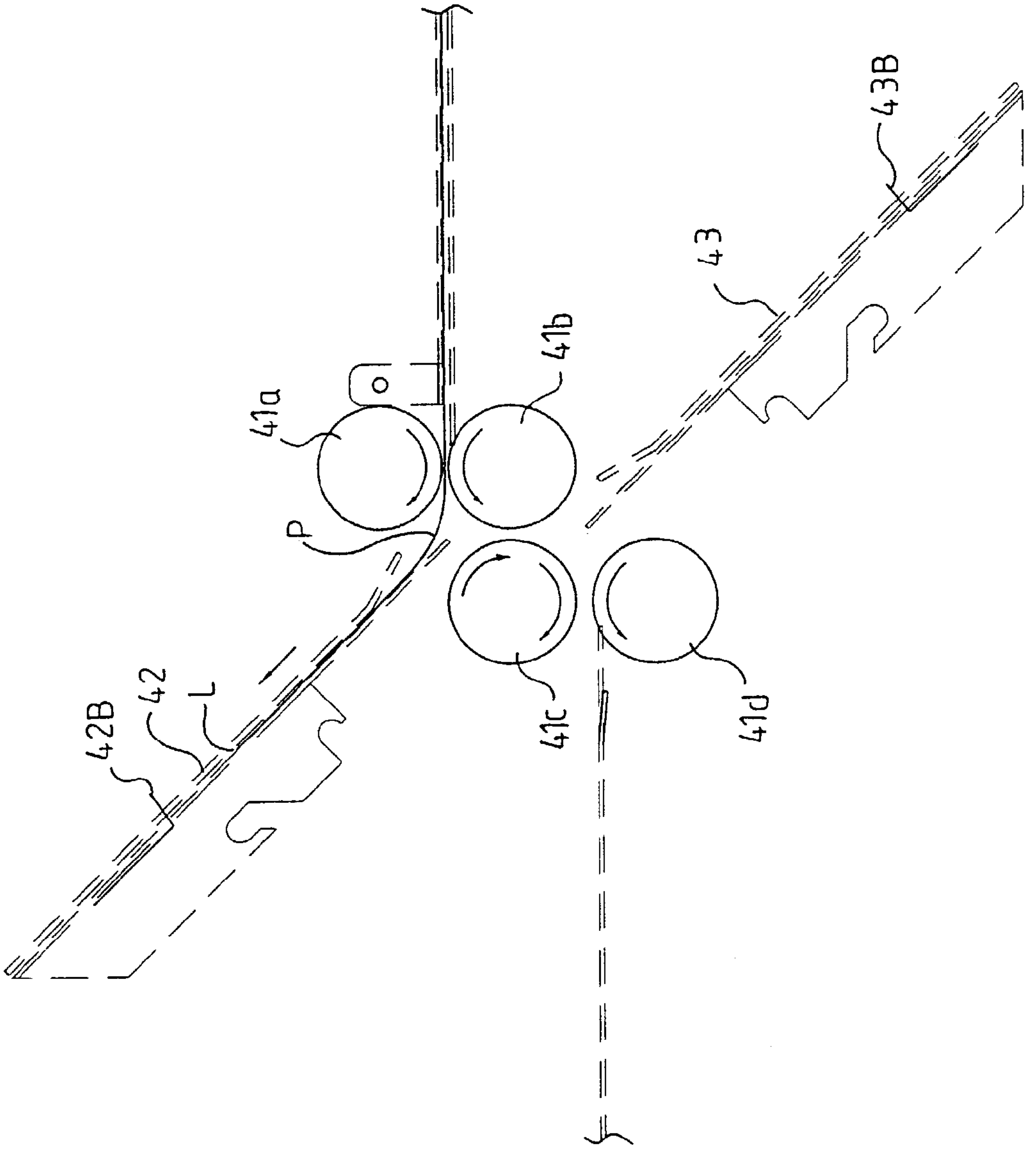
FIGS. 6(*a*) to 6(*e*) are schematic views illustrating the various steps for folding the papers in the folding device.
Figure 6B:
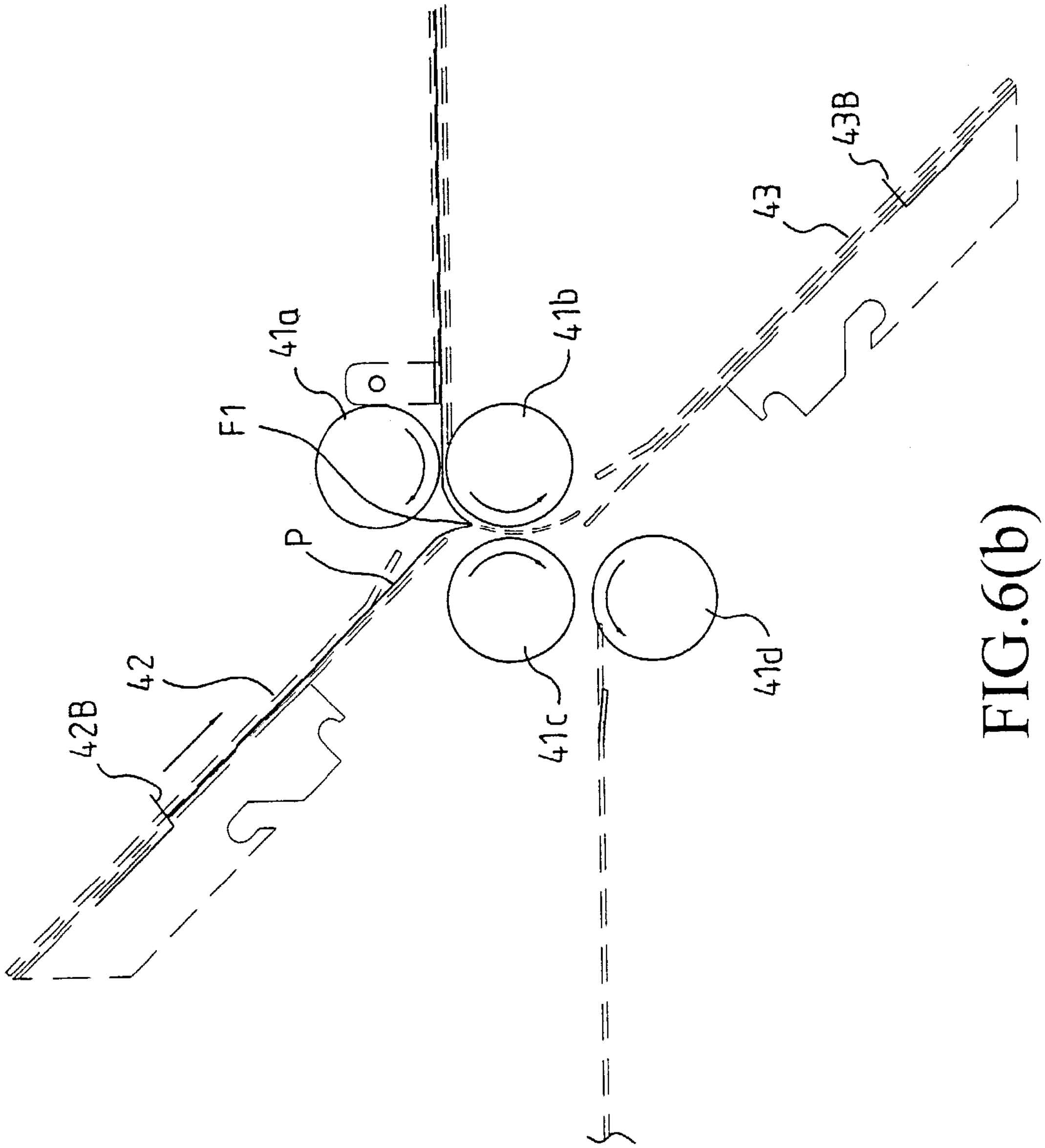
Figure 6C:
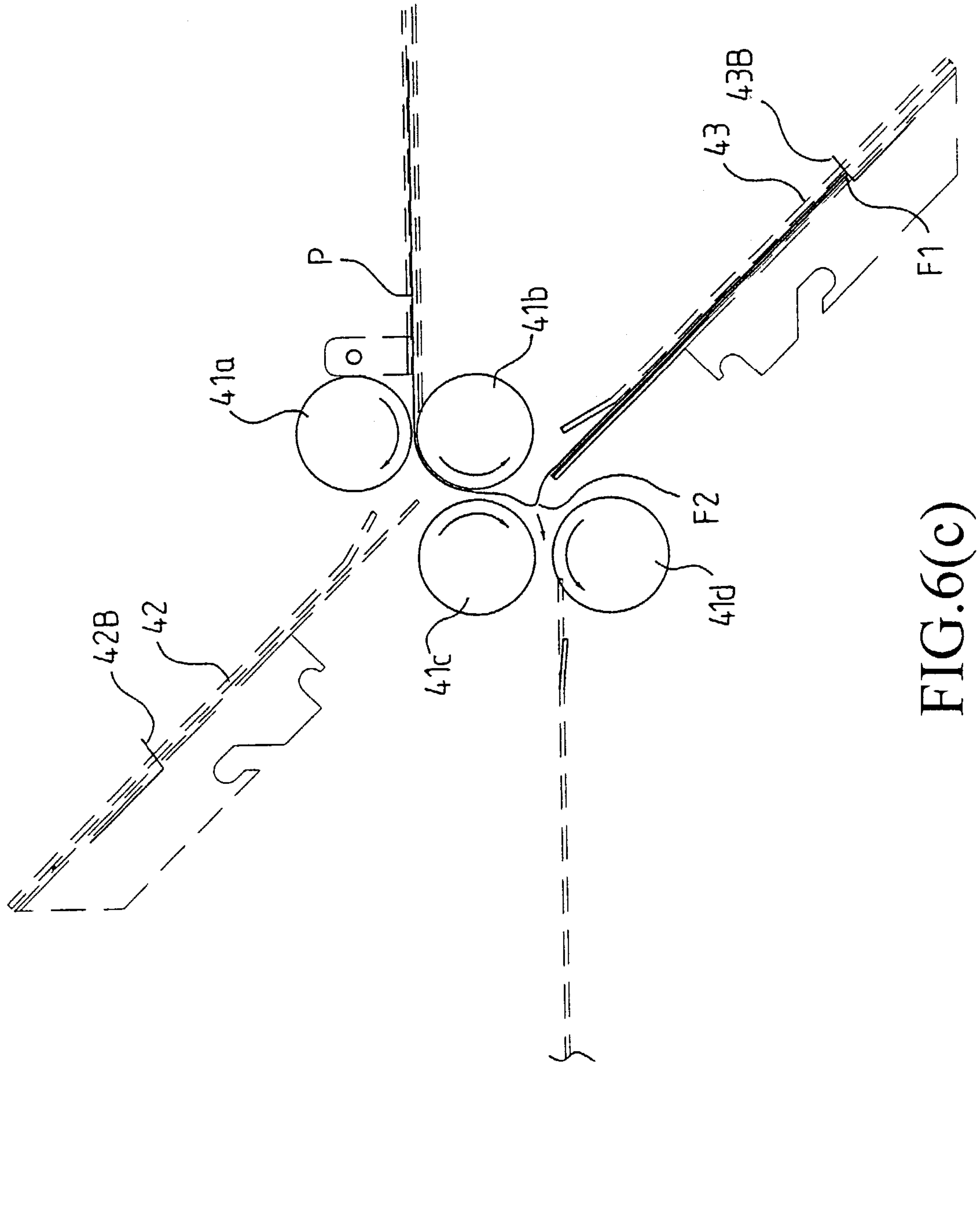
Figure 6D:
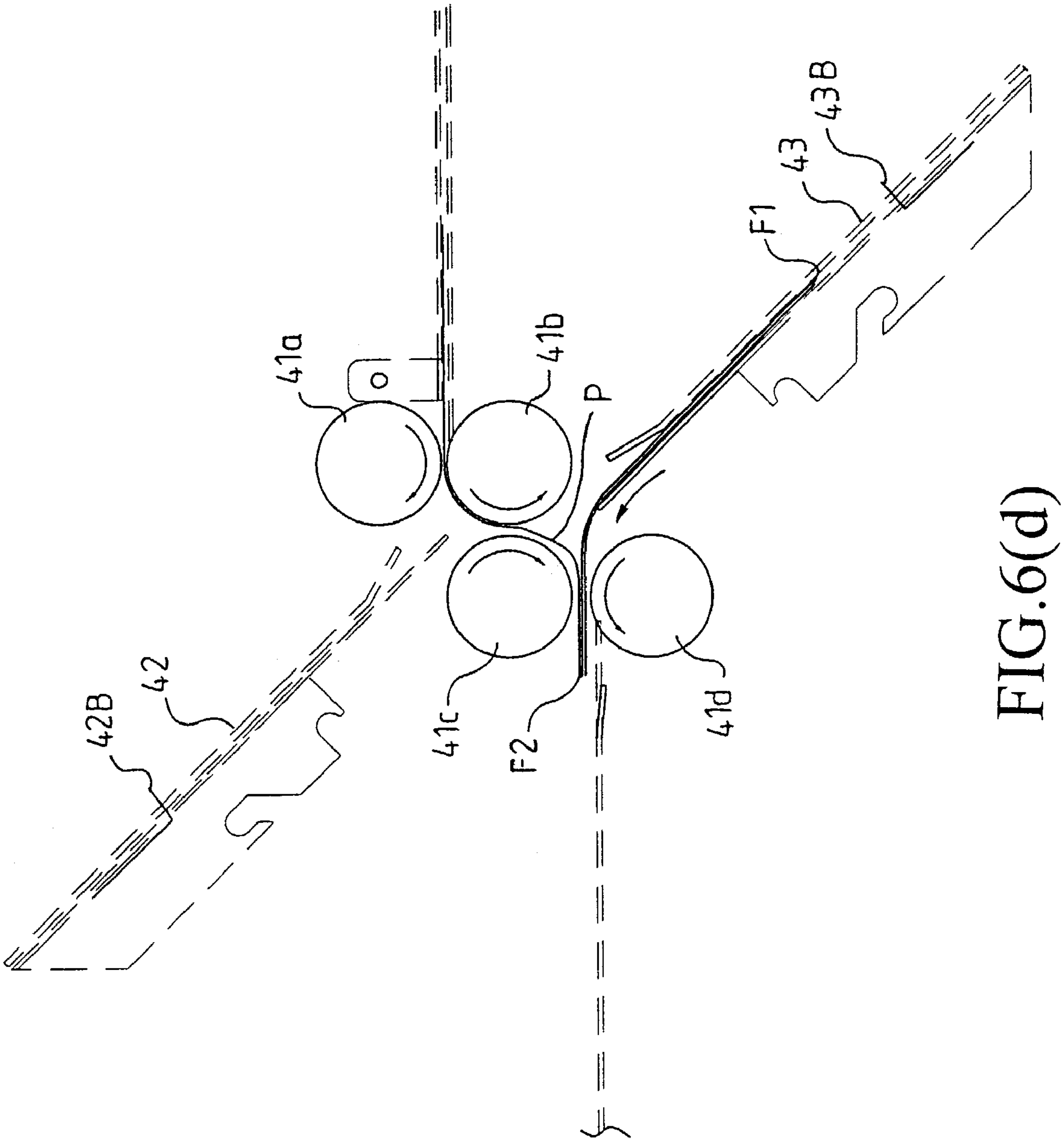
Figure 6E:
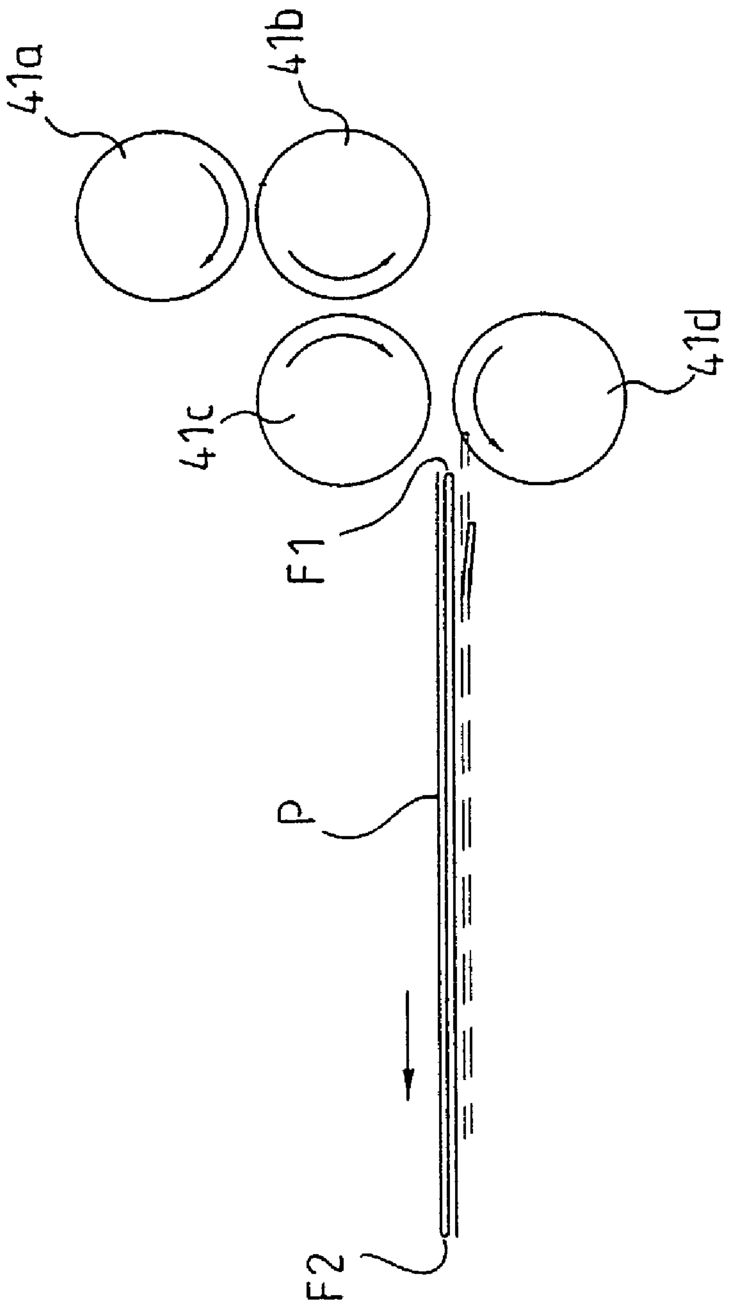

FIG. 4 illustrates the details of the buffer 10 and paper entry 20. FIG. 5 is a top plan view of the pressure sealer apparatus 1.

As shown in FIGS. 1 and 4, the buffer 10 is controlled by a buffer motor 10M and a buffer switch 10S to move between an inactivated position and an activated position.

Under the state of normal operation, the buffer 10 is at its inactivated position, that is, the position shown by the solid lines in FIG. 4 that allows a piece of paper P to enter the paper entry 20 along a direction shown by an arrow F. During the occurrences of paper jamming in the pressure sealer apparatus 1, the buffer motor 10M is actuated to generate a magnetic force subjecting the buffer switch 10S to drive the buffer 10 to move to the activated position, that is, the position shown by the broken lines in FIG. 4. At this time, papers that are yet to enter the paper entry 20 will be guided to move along a direction shown by an arrow B to a holding zone formed by the lid 15. After elimination of paper jamming, the buffer motor 10M is deactivated to stop generation of the magnetic force subjecting the buffer switch 10S to drive the buffer 10 to move to the inactivated position that allows the papers to enter the paper entry 20.

Papers leaving the paper entry 20 then enter the paper alignment 30.

The paper alignment 30 includes: an alignment roller set 31 and a ball set 32. The alignment roller set 31 may be driven by an alignment roller set motor 31M. The ball set 32 includes a ball 34 that is freely rotatable in a frame 33 and suspended above the alignment roller set 31. As such, a paper path adapted to allow the papers P to pass through is formed between the alignment roller set 31 and the ball set 32. In this embodiment, two ball sets 32 are provided above the alignment roller set 31 The number of ball sets may be varied according to one's needs.

In the paper alignment 30, the paper path formed between the alignment roller set 31 and the ball set 32 prevents the alignment roller set motor 31 from applying excessive pulling forces to the papers that are still under control of printer rollers, which may possibly result in ripping.

With reference to FIG. 5, if the piece of paper leaving the paper entry 20 is not properly aligned, only a corner of the paper P will first contact the folding device 40 and the paper P is prevented from further transmission by the yet to be activated folding device 40. At this time, the alignment roller set 31 continues transmission of the paper P. Because the balls 34 in the frames 33 allow rotation in all directions, the flank of the paper P that is not obstructed by the folding device 40 is able to pivot about the corner that is in contact with the folding device 40 so as to align a leading edge L of the paper P with the folding device 40.

After the leading edge L of the paper P is completely aligned with the folding device 40, the folding device 40 is activated by a signal generated by a sensor (not shown) that is provided next to an upstream of the folding device 40, sensing that the paper P is in place. At this time, the paper P enters the folding device 40 easily in a properly aligned orientation.

The folding device 40 as illustrated in this invention is a conventional three-fold folding device 40. Persons skilled in the art may easily adapt a conventional two-fold folding device in this invention.

With reference to FIG. 3, the tri-fold folding device 40 includes: at least four folding rollers, that is, a first folding roller 41*a*, a second folding roller 41*b*, a third folding roller 41*c*and a fourth folding roller 41*d*; a first folding line adjustment board 42; and a second folding line adjustment board 43. The four folding rollers 41*a*–41*d* are driven by a folding roller motor 41M (FIG. 2). A paper path is formed between every two neighboring folding rollers, such as between rollers 41*a* and 41*b*, 41*b* and 41*c* and 41*c* and 41*d*. The first folding line adjustment board 42 includes a baffle 42B with an adjustable position that may be adjusted by releasable screws or other known means. The first folding line adjustment board 42 is provided at an exit of the paper path formed between the folding rollers 41*a* and 41*b*. The second line folding adjustment board 43 includes a baffle 43 with an adjustable position that may be adjusted by releasable screws or other known means. The second line folding adjustment board 43 is provided at an exit of the paper path formed between the folding rollers 41*b* and 41*c*.

FIGS. 6(*a*) to 6(*e*) are schematic views illustrating the various steps for folding the papers in the folding device 40.

As shown in FIG. 6(*a*), after the leading edge L of the paper P aligns with the folding device 40, the paper P is able to enter the folding device 40. The folding roller motor 41M continues to drive the folding rollers 41*a*–41*d* to cause transmission of the paper P until the leading edge L of the paper P comes into contact with the baffler 42B of the first folding line adjustment board 42. With reference to FIG. 6(*b*), because the leading ledge L of the paper P is obstructed by the baffle 42B, subsequent driving of the folding rollers 41*a*–41*d* will cause a first folding line F1 to form at the exit of the paper path formed between the folding rollers 41*a* and 41*b*, and cause the first folding line F1 of the paper P to enter the paper path formed between the folding rollers 41*b* and 41*c*. At this time, the folding roller motor 41M still continues to drive the folding rollers 41*a*–41*d* to cause transmission of the paper P until the first folding line F1 of the paper P comes into contact with the baffle 43B of the second folding line adjustment board 43. With reference to FIG. 6(*c*), because the first folding line F1 of the paper is obstructed by the baffle 43B, subsequently driving of the folding rollers 41*a*–41*d* will cause a second folding line F2 to form at the exit of the paper path formed between the folding rollers 41*c* and 41*d* and cause the second folding line F2 of the paper P to enter the paper path formed between the folding rollers 41*c* and 4l*d*. With reference to FIG. 6(*d*), the folding roller motor 41M still continues to drive the folding rollers 41*a*–41*d* to cause transmission of the paper P until the paper P completely leaves the exit of the paper path formed between the folding rollers 41*c* and 41*d*, as shown in FIG. 6(*e*). At this time, a signal generated by another sensor (not shown) that is provided next to a downstream of the folding device 40 sensing that the paper P completely leaves the folding device 40, will deactivate the folding device 40.

Papers P leaving the folding device 40 then enter the presser 50.

As shown in FIG. 5, the presser 50 includes a pressure cylinder 51 driven by a pressure cylinder motor 51M (FIG. 2). The pressure cylinder 51 is situated to form an angle with respect to the alignment roller set 31. Only a corner the folded paper P will first come into contact with the pressure cylinder 51 due to the angled orientation of the pressure cylinder 51 with respect to the alignment roller set 31. As such, the folded paper P having a relatively large thickness may still be easily glided underneath the pressure cylinder 51 even without implementing a large-sized pressure cylinder or a heavy duty pressure cylinder motor because the pressure cylinder 51 only needs to engage a portion of the folder paper P during the initial stage. Furthermore, during the initial and later stages that the folded paper P is glided underneath the pressure cylinder 51, only a portion of the paper P is subjected to the forces applied by the pressure cylinder 51. As such, a compact pressure cylinder 51 can still ensure that the forces applied to the paper margins are adequate to cause the pressure-sensitive adhesion pre-coated to part of the margins of particular folds to seal with margins of neighboring folds, for forming a sealed mail.

To prevent the pressure cylinder motor 51M driving the pressure cylinder 51 and the folding roller motor 41M driving the folding rollers 41*a*–41*d* to apply transmission forces to the paper P simultaneously, according to an embodiment of this invention, a conventional one-way clutch may be provided between the folding rollers 41*a*–41*d* and folding roller motor 41M, wherein the one-way clutch only allows the folding roller motor 41M to drive the folding rollers 41*a*–41*d*, when the rotational speed and operation of the roller motor 41M are not affected by other forces (such as the indirect pulling forces that the pressure cylinder motor 51M applied to the paper P) that are indirectly to applied to the folding rollers 41*a*–41*d*.

Folded and sealed papers P (or mails) leaving the presser 50 then leave the pressure sealer apparatus 1 through the exit 60 to complete the folding and sealing processes.

The pressure sealer apparatus 1 according to this invention may form an on-line connection with a printer. During occurrences of paper jamming in the pressure sealer apparatus 1, a signal may be transmitted to the printer signaling the printer to suspend the printing task.

If the printer connected to the pressure sealer apparatus 1 is a closed design that does not accept external control signals, this invention further discloses that a manipulator capable of adjusting its operative range may be alternatively provided adjacent to the paper entry 20. During occurrences of paper jamming in the pressure sealer apparatus 1, at the same time that the buffer 1 is moved to the activated position, the manipulator 70 is driven to trigger a pause button situated on the printer control panel to deactivate or suspend the printing task. At this time, a couple of pieces of papers that are still printed by the printer may be guided into the holding zone formed by the lid 11 along the direction shown by the arrow B in FIG. 4. After elimination of the paper jamming, at the same time that the buffer 10 is moved to the inactivated position, the manipulator 70 is driven to deactivate the pause button situated at the printer control panel to resume the printing task. At this time, papers printed by the printer may then again enter the paper entry 20 along the direction shown by the arrow F in FIG. 4.

The pressure sealer apparatus according this invention is capable of automatically aligning the papers by adopting the paper alignment of this invention so as to ensure a neat appearance for the sealed mails.

The pressure cylinder situated to form angle with the alignment roller set in the pressure sealer apparatus according to this invention further ensures that the forces applied to the paper margins are adequate to cause the pressure-sensitive adhesion pre-coated to part of the margins of particular folds to seal with margins of neighboring folds, with the implementation of a compact pressure cylinder and a light-duty motor for forming a sealed mail, so as to obtain a compact and lightweight pressure sealer apparatus.

Further, the pressure sealer apparatus according to this invention allows on-line connection with a printer by automatically controlling activation and deactivation of the printing task during the occurrences of paper jamming to prevent system shutdown.

Due to the compact and lightweight features provided by the pressure sealer apparatus according the this invention, the pressure sealer apparatus of this invention allows on-line connection with most of the commercially available laser printers and is suitable to be equipped in a regular office space so as to meet the needs of print-on-demand and print-to-mail.

This invention is related to a novel creation that makes a breakthrough in the art. Aforementioned explanations, however, are directed to the description of preferred embodiments according to this invention. Various changes and implementations can be made by persons skilled in the art without departing from the technical concept of this invention. Since this invention is not limited to the specific details described in connection with the preferred embodiments, changes to certain features of the preferred embodiments without altering the overall basic function of the invention are contemplated within the scope of the appended claims.

NOMENCLATURE LISTING

1 pressure sealer apparatus
10 buffer
10M buffer motor
10S buffer switch
11 lid
20 paper entry
30 paper alignment
31 alignment roller set
31M alignment roller set motor
32 ball set
33 frame
34 ball
40 folding device
41*a*–41*d* folding roller
41M folding roller motor
42 first folding line adjustment board
42B baffle
43 second folding line adjustment board
43B baffle
50 presser
51 pressure cylinder
51M pressure cylinder motor
60 exit
70 manipulator
A pressure-sensitive adhesion
B arrow
F arrow
F1 first folding line
F2 second folding line
L leading edge
P paper

What is claimed is:

1. A pressure sealer apparatus for folding and sealing papers coated with adhesion at part of margins thereof into a self-mailer, comprising:

a buffer, controlled by a buffer motor and a buffer switch to move between an inactivated and an activated position;

a paper entry provided at a downstream of the buffer;

a paper alignment provided at a downstream of the paper entry, including an alignment roller set and a ball set, the ball set having a ball freely rotatable in a frame and suspended above the alignment roller set;

a folding device provided at a downstream of the paper alignment;

a presser provided at a downstream of the folding device, including a pressure cylinder situated to form an angle with respect to the alignment roller; and an exit provided at a downstream of the presser, wherein the buffer motor drives the buffer switch to move the buffer to the activated position during occurrences of paper jamming in the pressure sealer apparatus, and drives the buffer switch to move the buffer to the inactivated position after elimination of the paper jamming.

2. The pressure sealer apparatus according to claim 1, wherein the buffer allows papers to enter the paper entry at the inactivated position, and guides papers into a holding zone at the activated position.

3. The pressure sealer apparatus according to claim 1, wherein the ball and the alignment roller set form a paper path therebetween adapted to allow papers to pass through.

4. The pressure sealer apparatus according to claim 1, wherein the folding device is a tri-fold folding device.

5. The pressure sealer apparatus according to claim 4, wherein the folding device includes:

a first folding roller, a second folding roller, a third folding roller and a fourth folding roller driven by a folding roller motor, between every two neighboring folding rollers being formed with a paper path;

a first folding line adjustment board having a baffle with an adjustable position and being provided at an exit of the paper path formed between the first and second folding rollers; and a second folding line adjustment board having a baffle with an adjustable position and being provided at an exit of the paper path formed between the second and third folding rollers.

6. The pressure sealer apparatus according to claim 5, further comprising: a one-way clutch provided between the folding rollers and the folding roller motor, wherein the one-way clutch allows the folding roller motor to drive the folding rollers and prevents the folding rollers from driving the folding roller motor.

7. The pressure sealer apparatus according to claim 1, further comprising: a manipulator adjacent to the paper entry and capable of adjusting its operative range for triggering a device external to the pressure sealer apparatus to suspend printing task during occurrences of paper jamming in the pressure sealer apparatus.

8. The pressure sealer apparatus according to claim 7, wherein the external device is a laser printer connected to the pressure sealer apparatus.

9. The pressure sealer apparatus according to claim 1, wherein the alignment roller set is driven by an alignment roller set motor and the pressure cylinder is driven by a pressure cylinder motor.

* * * * *